US012687410B2

(12) United States Patent
Schneider

(10) Patent No.: US 12,687,410 B2
(45) Date of Patent: Jul. 21, 2026

(54) RECONFIGURABLE TRANSMITTER ARRAY FOR ELECTROMAGNETIC TRACKING SYSTEMS

(71) Applicant: Northern Digital Inc., Waterloo (CA)

(72) Inventor: Mark Robert Schneider, Williston, VT (US)

(73) Assignee: Northern Digital Inc., Waterloo (CA)

( * ) Notice: Subject to any disclaimer, the term of this patent is extended or adjusted under 35 U.S.C. 154(b) by 15 days.

(21) Appl. No.: 18/594,474

(22) Filed: Mar. 4, 2024

(65) Prior Publication Data

US 2024/0247955 A1     Jul. 25, 2024

Related U.S. Application Data

(62) Division of application No. 17/031,350, filed on Sep. 24, 2020, now Pat. No. 11,953,349.

(Continued)

(51) Int. Cl.
*G01D 5/20*     (2006.01)
*G06T 7/70*     (2017.01)
*H04N 23/20*    (2023.01)

(52) U.S. Cl.
CPC ............. *G01D 5/2073* (2013.01); *G06T 7/70* (2017.01); *H04N 23/20* (2023.01); *G06T 2207/10048* (2013.01); *G06T 2207/30204* (2013.01)

(58) Field of Classification Search
CPC .................................................. G01D 5/2073
See application file for complete search history.

(56) References Cited

U.S. PATENT DOCUMENTS 5,545,993 A     8/1996   Taniguchi et al.
5,729,129 A     3/1998   Acker
(Continued)

FOREIGN PATENT DOCUMENTS

CN       1901835       1/2007
CN       105222772     1/2016
(Continued)

OTHER PUBLICATIONS

Ernst et al., "A Survey of Algorithms for Respiratory Motion Prediction in Robotic Radiosurgery," Informatik 2009—In Focus, Life, Jan. 2009, 10 pages.

(Continued)

*Primary Examiner* — Walter L Lindsay, Jr.
*Assistant Examiner* — Milton Gonzalez
(74) *Attorney, Agent, or Firm* — Fish & Richardson P.C.

(57)                ABSTRACT

A magnetic tracking system is configured to determine an object pose of a tracked object in an environment of the magnetic tracking system. The tracking system includes a transmitter assembly that includes a transmitting coil configured to generate a magnetic signal indicative of an object pose of a tracked object with respect to the transmitter assembly and a marker that visually identifies a pose of the transmitter assembly with respect to a camera device. The camera device captures at least one image of the transmitter assembly. A computing device determines, based on the image, a pose for the transmitter assemblies in the image. Based on the magnetic signal and the pose associated with the transmitter assembly, the computing device determines the object pose of the tracked object in the environment.

19 Claims, 10 Drawing Sheets

Related U.S. Application Data

(60) Provisional application No. 62/906,532, filed on Sep. 26, 2019.

(56) References Cited

U.S. PATENT DOCUMENTS

| | | | |
|---|---|---|---|
| 6,059,718 A | 5/2000 | Taniguchi et al. | |
| 6,211,666 B1 | 4/2001 | Acker | |
| 6,432,041 B1 * | 8/2002 | Taniguchi | A61B 5/06 |
| | | | 600/117 |
| 6,774,624 B2 | 8/2004 | Anderson et al. | |
| 7,505,809 B2 | 3/2009 | Strommer et al. | |
| 7,599,730 B2 | 10/2009 | Hunter et al. | |
| 7,660,623 B2 | 2/2010 | Hunter et al. | |
| 7,697,972 B2 | 4/2010 | Verard et al. | |
| 7,818,044 B2 | 10/2010 | Dukesherer et al. | |
| 7,835,785 B2 | 11/2010 | Scully et al. | |
| 7,974,677 B2 | 7/2011 | Mire et al. | |
| 8,000,772 B2 * | 8/2011 | Govari | A61B 90/36 |
| | | | 600/424 |
| 8,060,184 B2 | 11/2011 | Hastings et al. | |
| 8,074,662 B2 | 12/2011 | Hunter et al. | |
| 8,239,001 B2 | 8/2012 | Verard et al. | |
| 8,290,572 B2 | 10/2012 | Martinelli et al. | |
| 8,882,511 B2 | 11/2014 | McKenzie et al. | |
| 8,934,961 B2 * | 1/2015 | Lakin | A61B 90/36 |
| | | | 600/407 |
| 9,241,656 B2 * | 1/2016 | Govari | A61B 5/062 |
| 9,480,415 B2 | 11/2016 | Wald et al. | |
| 9,629,570 B2 | 4/2017 | Bar-Tal | |
| 10,064,567 B2 | 9/2018 | Ghosh et al. | |
| 11,953,349 B2 | 4/2024 | Schneider | |
| 2005/0104776 A1 | 5/2005 | Anderson | |
| 2010/0249571 A1 | 9/2010 | Jensen et al. | |
| 2010/0305427 A1 | 12/2010 | Huber et al. | |
| 2011/0251625 A1 | 10/2011 | Bulitta et al. | |
| 2012/0165656 A1 | 6/2012 | Montag et al. | |
| 2015/0305823 A1 | 10/2015 | Claus | |
| 2016/0015292 A1 | 1/2016 | Lorraine et al. | |
| 2016/0242855 A1 | 8/2016 | Fichtinger et al. | |
| 2016/0331263 A1 | 11/2016 | Cailler et al. | |
| 2016/0354009 A1 | 12/2016 | Schroeder | |
| 2017/0065204 A1 | 3/2017 | Ludwin et al. | |
| 2017/0245946 A1 | 8/2017 | Tabandeh et al. | |
| 2018/0116751 A1 | 5/2018 | Schwartz et al. | |
| 2018/0146933 A1 | 5/2018 | Lerch et al. | |
| 2019/0060001 A1 | 2/2019 | Kohli et al. | |
| 2019/0123598 A1 * | 4/2019 | Patmore | H02J 7/0044 |
| 2019/0237985 A1 * | 8/2019 | Piunti | H02J 50/10 |
| 2019/0242952 A1 | 8/2019 | Schneider et al. | |
| 2020/0046437 A1 | 2/2020 | Kronman | |
| 2020/0320721 A1 | 10/2020 | Holladay et al. | |
| 2020/0321099 A1 | 10/2020 | Holladay et al. | |
| 2021/0096001 A1 | 4/2021 | Schneider | |

FOREIGN PATENT DOCUMENTS

| | | | |
|---|---|---|---|
| CN | 105919595 A | | 9/2016 |
| CN | 107072740 | | 8/2017 |
| CN | 108472076 A | | 8/2018 |
| EP | 0830562 | | 3/1998 |
| JP | 2015144533 A | * | 8/2015 |
| KR | 20190012999 A | | 2/2019 |
| WO | WO 2002098273 | | 12/2002 |

OTHER PUBLICATIONS

Hartley et al., "Multiple View Geometry in computer vision," Second Edition, Cambridge University Press, Apr. 19, 2004, 673 pages.

Szeliski et al. "Computer Vision: Algorithms and Applications," Springer, Sep. 3, 2010, 979 pages.

* cited by examiner

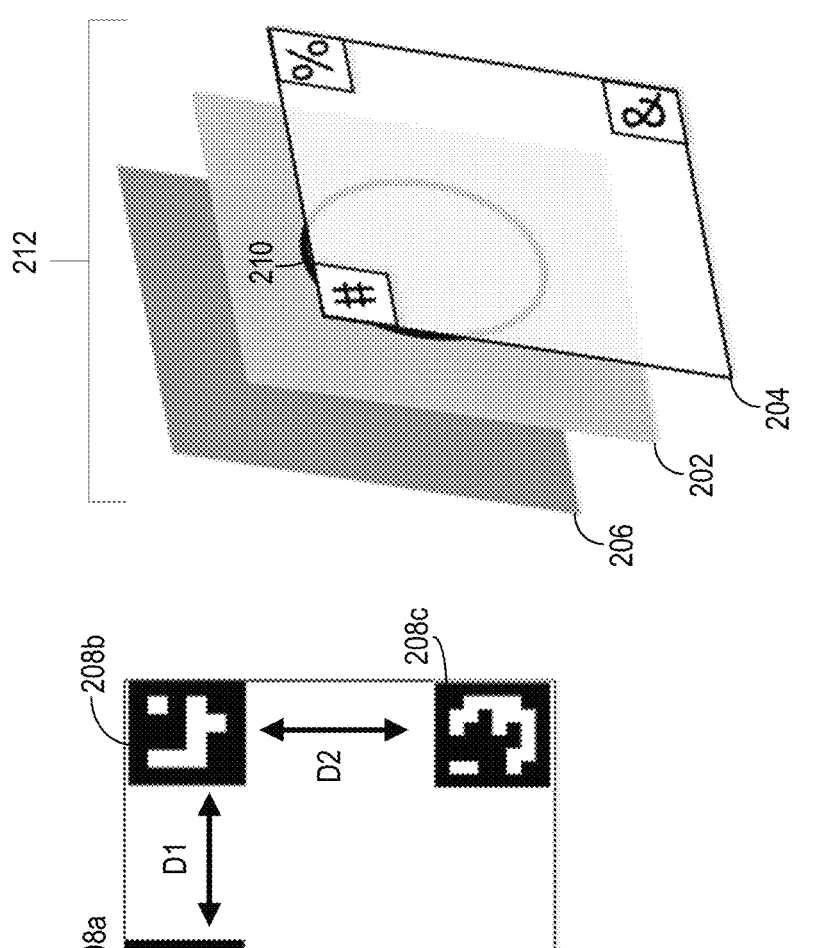
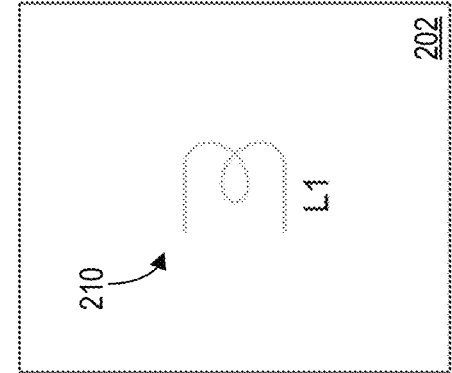
FIG. 2A

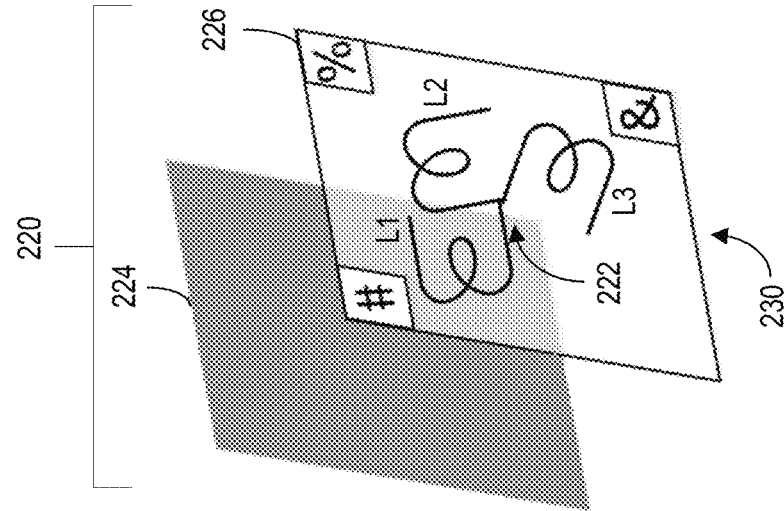
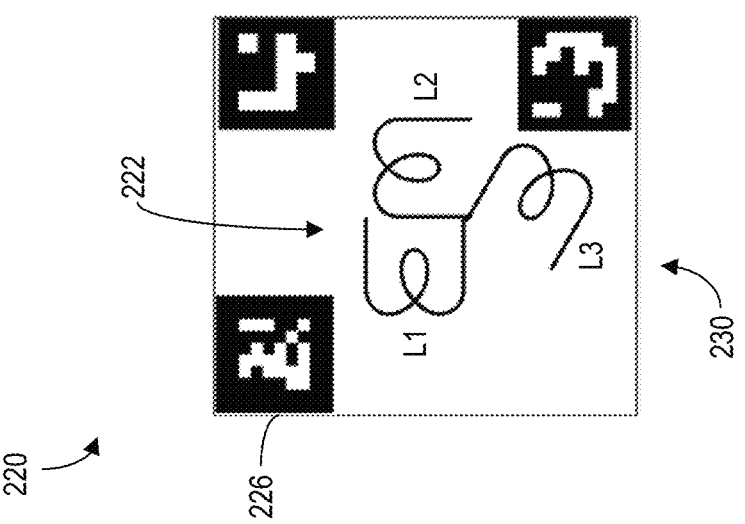
FIG. 2B

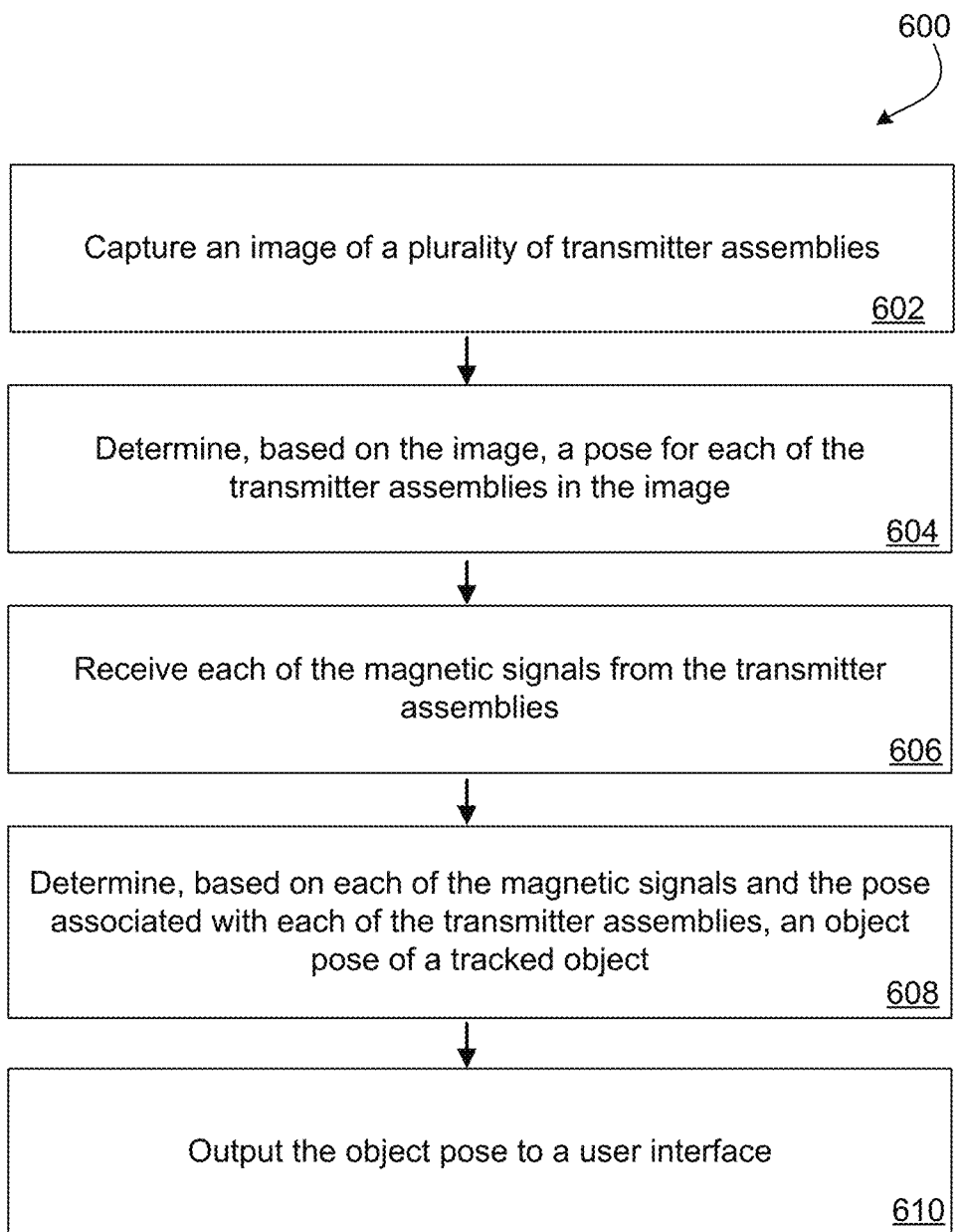

600

Capture an image of a plurality of transmitter assemblies

602

Determine, based on the image, a pose for each of the transmitter assemblies in the image

604

Receive each of the magnetic signals from the transmitter assemblies

606

Determine, based on each of the magnetic signals and the pose associated with each of the transmitter assemblies, an object pose of a tracked object

608

Output the object pose to a user interface

RECONFIGURABLE TRANSMITTER ARRAY FOR ELECTROMAGNETIC TRACKING SYSTEMS

CROSS-REFERENCE TO RELATED APPLICATIONS

This application is a divisional application of and claims the benefit of priority under 35 U.S.C. § 121 to U.S. patent application Ser. No. 17/031,350, filed on Sep. 24, 2020, which claims priority under 35 U.S.C. 119(e) to U.S. Patent Application No. 62/906,532, filed on Sep. 26, 2019, the contents of which are hereby incorporated by reference.

TECHNICAL FIELD

This disclosure relates to tracking one or more objects in a magnetic field, specifically a system for tracking a surgical instrument using electromagnetic (EM) signals.

BACKGROUND

Electromagnetic Tracking (EMT) systems are used to aid location of instruments and anatomy in medical procedures. Such systems can determine a position of a receiver based on measured field lines of a transmitted magnetic field.

SUMMARY

An Electromagnetic Tracking (EMT) system (also referred to as a magnetic tracking system) can be used to track a device for a number of applications, such as for medical applications during endoscope surgery or other types of surgery. The EMT system (also called a magnetic tracking system) includes at least one transmitter and at least one receiver. The transmitter emits, for example, a magnetic signal, and the receiver receives the magnetic signal and measures the magnetic signal. The measured magnetic signal provides information that the magnetic tracking system uses to determine relative locations of the transmitter with respect to the receiver (or vice versa). If the transmitter or receiver is affixed to another device (e.g., a tracked device), the magnetic tracking system can determine the relative location of the tracked device in the environment of the magnetic tracking system. In some implementations, the magnetic tracking system can detect distortions in the magnetic signal due to metallic objects in the environment. Numerous additional applications for tracking an object are known.

The magnetic tracking system described herein includes a plurality of transmitter assemblies. The magnetic tracking system is configured to determine a location of one or more objects with respect to the transmitter assemblies, such as by detecting the magnetic signals emitted by one or more of the plurality of transmitter assemblies. The transmitter assemblies are placed at different positions with respect to a receiver of the magnetic tracking system. The magnetic tracking system determines the locations of the transmitter assemblies relative to the transmitter by one or more non-magnetic techniques, such as by a visual techniques, ultrasound, a radio signal, etc. Once the locations of the transmitter assemblies are known, the magnetic tracking system can determine the position and orientation of the receivers.

Each of the transmitter assemblies can be uniquely marked so that the non-magnetic tracking system can distinguish between each of the transmitter assemblies of the plurality. The transmitter assemblies can be reconfigured (e.g., moved around) in the environment of the magnetic tracking system to improve the quality (e.g., accuracy) of the position determination of the tracked object by the magnetic tracking system.

The techniques described herein include one or more of the following advantages. The transmitter assemblies can be placed very close to the area of interest in the environment of the magnetic tracking system, which may vary for different applications of the magnetic tracking system. For example, the transmitter assemblies can include patches that are affixed to a patient during endoscopic surgery. The patches can be moved/rearranged during the surgery to keep the patches in close proximity to the operating area on the patient. This can be described as reducing or eliminating a standoff distance between the transmitter assemblies and the area of interest. The close proximity of the transmitter assemblies to the area of interest reduces distortions caused by metallic objects in the environment, such as metal operating tables, non-surgical equipment, and so forth. For example, the transmitter assemblies can be placed along the path of a catheter in a patient for improved magnetic tracking of the catheter.

The transmitter assemblies can also be rearranged to be strategically placed for the particular application. For example, if an X-ray image is being taken of a patient, the patches can be temporarily removed for the imaging process and reapplied after the imaging is complete without requiring re-calibration of the magnetic tracking system to resume use.

These methods reduce or eliminate a need to perform compensation of the distortion encountered in the typical environment for each instance in which the environment of the system is changed.

In an aspect, a magnetic tracking system includes a plurality of transmitter assemblies. At least one of the transmitter assemblies includes: a transmitting coil configured to generate a magnetic signal for the transmitter assembly, the magnetic signal indicative of an object pose of a tracked object with respect to the transmitter assembly; and a marker that visually identifies a pose of the transmitter assembly with respect to a camera device. The camera device is configured to capture at least one image of the plurality of transmitter assemblies that includes a representation of the marker on the at least one of the transmitter assemblies. A computing device is configured to perform operations including: determining, based on the image including the representation of the marker on the at least one of the transmitter assemblies, a pose for the at least one of the transmitter assemblies in the image; receiving each of the magnetic signals from the transmitter assemblies; determining, based on each of the magnetic signals and the pose associated with each of the transmitter assemblies, the object pose of the tracked object in the environment; and outputting a representation of the object pose.

In some implementations, at least one transmitter assembly of the plurality of transmitter assemblies is configured for being moved from a first position in the environment to second position in the environment during operation of the magnetic tracking system, and where the computing device is configured to update a pose associated with the transmitter assembly.

In some implementations, the marker comprises an icon. The marker for a transmitter assembly comprises an outer shape of the transmitter assembly, the outer shape being distinct from other outer shapes of the other transmitter assemblies of the plurality. In some implementations, the marker comprises an infrared retroreflector, and where the camera device comprises an infrared source.

In some implementations, at least one transmitter assembly of the plurality comprises: a memory configured to store calibration data related to the transmitter assembly; a processing device configured to control transmission of the magnetic signal from the transmitter assembly; a communication interface for sending and receiving data from the computing device or other transmitter assemblies of the plurality; and a power source configured to provide electrical power to the memory, the processing device, and the communication interface. The memory can be configured to store calibration data related to the receiver assembly.

In some implementations, at least one transmitter assembly of the plurality is configured to wirelessly communicate with the computing device. In some implementations, at least one transmitter assembly of the plurality comprises an adhesive configured to removably affix the transmitter assembly to another surface in the environment.

In some implementations, the tracked object comprises one of a catheter, an endoscope, or a surgical instrument.

In some implementations, the computing device is configured to control the plurality of transmitter assemblies to generate the magnetic signals. Controlling the plurality of transmitter assemblies can include performing a time-slice multiplexing of each of the transmitter assemblies, the time-slice multiplexing causing each of the transmitter assemblies of the plurality to transmit the magnetic signals at different times in a sequence. In some implementations, controlling the plurality of transmitter assemblies comprises performing a frequency multiplexing of each of the transmitter assemblies, the frequency multiplexing configured to cause each of the transmitter assemblies of the plurality to transmit the magnetic signals at different frequency values.

In some implementations, the plurality of transmitter assemblies are connected to the computing device in parallel. In some implementations, the plurality of transmitter assemblies are connected to the computing device in sequence. In some implementations, at least one transmitter assembly of the plurality of transmitter assemblies is modular, where the computing device is configured to update a tracking algorithm in response to detecting that the modular transmitter assembly has been removed. In some implementations, the magnetic tracking system includes a receiver assembly configured to measure the magnetic signals from one or more of the transmitter assemblies, the receiver assembly including a receiver marker that visually identifies a pose of the receiver assembly with respect to the camera device.

In some implementations, the computing device is configured to determine a distortion of the magnetic signal based on a first pose associated with the receiver assembly and a second pose associated with a transmitter assembly of the plurality of transmitter assemblies.

In an aspect, a transmitting coil configured to generate a magnetic signal in response to receiving an electric current; a first surface including at least one marker, the at least one marker configured to identify a pose of the transmitter assembly with respect to a camera device; and a second surface configured to removably affix to another object.

In some implementations, the transmitter assembly includes a memory configured to store calibration data related to the transmitter assembly; a processing device configured to control transmission of the magnetic signal from the transmitter assembly; a communication interface for sending and receiving data to a remote device; and a power source configured to provide electric power for the memory, the processing device, and the communication interface. In some implementations, the communication interface is configured to wirelessly communicate with the remote device.

In some implementations, the power source is rechargeable. In some implementations, the marker comprises one of an ArUco pattern, a ChArUco pattern, an infrared retroreflector, a light source, an ultrasonic source, a radio signal source, and an outer shape of the transmitter assembly.

In a general aspect, a process is for determining an object pose of a tracked object in an environment of a magnetic tracking system. The process includes obtaining, from each of one or more transmitter assemblies, a magnetic signal indicative of an object pose of a tracked object with respect to the transmitter assembly. The process includes obtaining image data representing a marker the one or more transmitter assemblies. The process includes determining, based on the image data representing the marker on each of the one or more transmitter assemblies, a pose for each of the respective one or more transmitter assemblies. The process includes determining, based on the magnetic signal of each of the one or more transmitter assemblies and the pose associated with each of the respective one or more transmitter assemblies, an object pose of a tracked object in the environment. The process includes outputting a representation of the object pose of the tracked object.

In some implementations, at least one transmitter assembly of the plurality of transmitter assemblies is configured for being moved from a first position in the environment to second position in the environment during operation of the magnetic tracking system, and where the computing device is configured to update a pose associated with the transmitter assembly.

In some implementations, the marker comprises an icon. The marker for a transmitter assembly comprises an outer shape of the transmitter assembly, the outer shape being distinct from other outer shapes of the other transmitter assemblies of the plurality. In some implementations, the marker comprises an infrared retroreflector, and where camera device comprises an infrared source.

In some implementations, at least one transmitter assembly of the plurality comprises: a memory configured to store calibration data related to the transmitter assembly; a processing device configured to control transmission of the magnetic signal from the transmitter assembly; a communication interface for sending and receiving data from the computing device or other transmitter assemblies of the plurality; and a power source configured to provide electrical power to the memory, the processing device, and the communication interface. The memory can be configured to store calibration data related to the receiver assembly.

In some implementations, at least one transmitter assembly of the plurality is configured to wirelessly communicate with the computing device. In some implementations, at least one transmitter assembly of the plurality comprises an adhesive configured to removably affix the transmitter assembly to another surface in the environment.

In some implementations, the tracked object comprises one of a catheter, an endoscope, or a surgical instrument.

In some implementations, the computing device is configured to control the plurality of transmitter assemblies to generate the magnetic signals. Controlling the plurality of transmitter assemblies can include performing a time-slice multiplexing of each of the transmitter assemblies, the time-slice multiplexing causing each of the transmitter assemblies of the plurality to transmit the magnetic signals at different times in a sequence. In some implementations, controlling the plurality of transmitter assemblies comprises performing a frequency multiplexing of each of the transmitter assemblies, the frequency multiplexing configured to cause each of the transmitter assemblies of the plurality to transmit the magnetic signals at different frequency values.

In some implementations, the plurality of transmitter assemblies are connected to the computing device in parallel. In some implementations, the plurality of transmitter assemblies are connected to the computing device in sequence. In some implementations, at least one transmitter assembly of the plurality of transmitter assemblies is modular, where the computing device is configured to update a tracking algorithm in response to detecting that the modular transmitter assembly has been removed. In some implementations, the magnetic tracking system includes a receiver assembly configured to measure the magnetic signals from one or more of the transmitter assemblies, the receiver assembly including a receiver marker that visually identifies a pose of the receiver assembly with respect to the camera device.

In some implementations, the computing device is configured to determine a distortion of the magnetic signal based on a first pose associated with the receiver assembly and a second pose associated with a transmitter assembly of the plurality of transmitter assemblies.

In a general aspect, one or more non-transitory computer readable media are configured to store instructions that, when executed by one or more processing devices, cause the one or more processing devices to perform a process. The process is for determining an object pose of a tracked object in an environment of a magnetic tracking system. The process includes obtaining, from each of one or more transmitter assemblies, a magnetic signal indicative of an object pose of a tracked object with respect to the transmitter assembly. The process includes obtaining image data representing a marker the one or more transmitter assemblies. The process includes determining, based on the image data representing the marker on each of the one or more transmitter assemblies, a pose for each of the respective one or more transmitter assemblies. The process includes determining, based on the magnetic signal of each of the one or more transmitter assemblies and the pose associated with each of the respective one or more transmitter assemblies, an object pose of a tracked object in the environment. The process includes outputting a representation of the object pose of the tracked object.

The details of one or more embodiments of the subject matter described herein are set forth in the accompanying drawings and the description below. Other features, objects, and advantages of the subject matter will be apparent from the description and drawings, and from the claims.

DESCRIPTION OF DRAWINGS

FIG. 2A shows different views of an example transmitter assembly of the plurality of transmitter assemblies of FIGS. 1A-1B.

FIG. 2B shows different views of an example receiver assembly of the magnetic tracking system of FIGS. 1A-1B.

FIG. 6 is a flow diagram of a process for performing magnetic tracking with the magnetic tracking systems and transmitter assemblies of FIGS. 1A-5.

Like reference symbols in the various drawings indicate like elements.

DETAILED DESCRIPTION

An Electromagnetic Tracking (EMT) system (also called a magnetic tracking system) can be used in various environments, such as medical settings, to track an object (e.g., a tracked object). For example, in a surgical setting, the EMT system can be used to track medical equipment (e.g., a surgical tool) for one or more purposes (e.g., endoscopic surgery), thereby allowing the three-dimensional position (e.g., location) and the orientation of the object to be known to a medical professional (e.g., a surgeon) during a medical procedure. Generally, the magnetic tracking system 100 is configured to track objects inside a body to assist the medical professional with an operation performed by the medical professional.

The magnetic tracking system described herein includes a plurality of transmitter assemblies. The magnetic tracking system is configured to determine a location of one or more objects with respect to the transmitter assemblies, such as by detecting the magnetic signals emitted by one or more of the plurality of transmitter assemblies. The transmitter assemblies are placed at different positions/orientations with respect to a receiver of the magnetic tracking system. The magnetic tracking system determines the locations of the transmitter assemblies relative to the transmitter by one or more non-magnetic means, such as by a visual means, ultrasound, a radio signal, etc. Once the locations of the transmitter assemblies are known, the magnetic tracking system can determine the positions and orientations of those objects by tracking their receivers. This can be described as tracking the object (e.g., a tracked object). When the transmitter assemblies 106 are positioned relatively close to the tracked object (e.g., a few inches away), a more accurate determination of the position and orientation (e.g., a pose) of the object can be determined, relative to determinations of position and orientation of the object from signals of transmitter assemblies placed further away. This is in part because distortions introduced by the environment of the magnetic tracking system can be reduced or eliminated by placing the transmitter assemblies close to the tracked object.

Figure 1A:
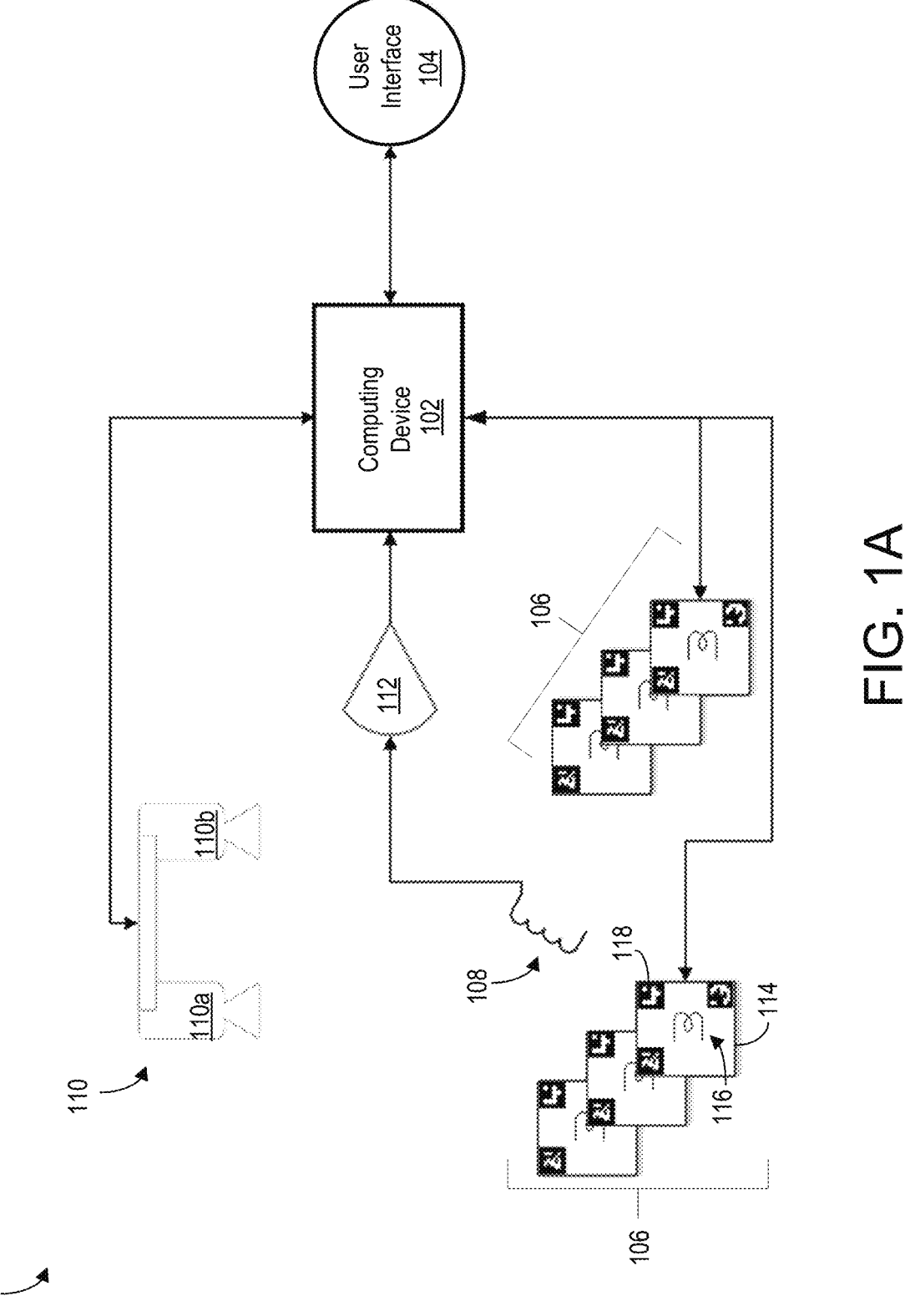
FIGS. 1A-1B show block diagrams of examples of magnetic tracking systems including a plurality of reconfigurable transmitter assemblies.

Turning to FIG. 1A, an example magnetic tracking system 100 is shown. The magnetic tracking system 100 includes a computing device 102, a user interface 104, an amplifier 112, a receiver 108, a camera device 110, and one or more transmitter assemblies 106.

The magnetic tracking system 100 is configured to track the position(s) and orientation(s) of one or more tracked objects (not shown) that are in the environment of the magnetic tracking system 100. In medical contexts, the tracked object generally includes a medical device or a portion of a medical device. For example, the magnetic tracking system 100 can be used to track items such as surgical instruments, probes, endoscopes, catheters, and so forth when they are inside a human body. The tracked object includes a receiver that senses a signal from one or more of the transmitter assemblies 106. The magnetic tracking system 100 can determine the position of the receiver of the tracked object based on these signals, as subsequently described in greater detail.

The magnetic tracking system 100 is configured to emit a magnetic signal (e.g., a magnetic field) from each of the plurality of transmitter assemblies 106. The receiver 108 is configured to measure the magnetic field and send the measured signal to the computing device 102. In some implementations, an amplifier 112 is included to amplify the signal that is measured by the receiver 108. The amplifier 112 generally has a positive gain configured to amplify any analog signals received from the receiver 108 so that the computing device 102 can receive the amplified signal as an input. The receiver 108 can include one or more elements for measuring the magnetic signal emitted by each of the transmitter assemblies 106, such as a magnetometers, coils, etc. For performing tracking of the tracked object, the position and orientation of the receiver 108 is calculated by computing device 102 using measurements of the fields from transmitter assemblies 106. The position and orientation of the transmitter assemblies 106 are known by observing the transmitter assemblies 106 with camera 110 or equivalent.

The transmitter assemblies 106 are each configured to emit a magnetic signal. A transmitter assembly, such as transmitter assembly 114, includes a transmitting element configured to generate a magnetic signal, such as a transmitter coil 116. While the transmitter assemblies 106 are described collectively, each of the transmitter assemblies can be slightly different (or even unique) from one or more of the other transmitter assemblies of the plurality. For example, each of the transmitter assemblies 106 can be configured to transmit a magnetic signal using a different modulating frequency. In some implementations, each coil 116 has slightly different magnetic properties. The computing device 102 can store information characterizing the magnetic properties of each of the transmitter assemblies 106.

During operation of the magnetic tracking system 100, each of the transmitter assemblies 106 is configured to emit a magnetic signal that can be measured by the receiver 108. The signals from each of the transmitter assemblies 106 can be distinguished from the other transmitter assemblies of the plurality. As stated previously, this can be achieved either by having each transmitter assembly include unique magnetic properties. In some implementations, each of the transmitter assemblies 106 is configured to emit a magnetic signal at a different time that is known by the computing device 102. In some implementations, each of the transmitter assemblies 106 is configured to emit a magnetic signal at a different frequency that is known by the computing device 102. Control of the transmitter assemblies 106 is subsequently described.

Each of the transmitter assemblies 106 is configured to be identifiable by a non-magnetic means to determine the position and orientation of each of the transmitter assemblies. The non-magnetic means can include one or more of an optical means, an ultrasonic means, a radio means, and so forth. Generally, each transmitter assembly includes one or more optical markings 118, such as a fiducial marker. The computing device 102 is configured to recognize the marker, distinguish the marker from other markers, and determine a portion and orientation of the marker (and thus the position and orientation of a transmitter assembly) from images of the marker.

A camera 110 is positioned to view the transmitter assemblies 106 and provide images of the transmitter assemblies to the computing device 102. The computing device 102 receives the images and determines a position and orientation for each of the transmitter assemblies 106 from the images. The camera 110 is positioned to view the transmitter assemblies 106 wherever they are placed for a given application. For example, in a medical context, the camera 110 is placed above the patient and the transmitter assemblies 106 are placed on and around the patient. The camera 110 is configured to capture images of the patient and the transmitter assemblies 106 on and around the patient to determine the positions and orientations of the transmitter assemblies with respect to the receiver 108.

In some implementations, the camera 110 can be a stereoscopic camera including two cameras, such as camera 110$a$, and camera 110$b$ that are displaced from one another. The cameras 110$a$, 110$b$ are configured to capture images from different angles with respect to the transmitter assemblies 106. The images from the stereoscopic cameras 110$a$, 110$b$ can be used to determine not only planar "x, y" position data and yaw of the transmitter assemblies 106, but also the depth "z" position of the transmitter assemblies 106 and the roll and pitch of each of the transmitter assemblies 106 with respect to the cameras 110$a$, 110$b$.

The data representing the relative positions and orientations of the transmitter assemblies 106 are used by the computing device 102 to determine how to interpret the magnetic signals received from the receiver 108. The magnetic signals indicate a position and orientation of the tracked device relative to the transmitter assemblies 106. To determine the absolute position and orientation of the tracked device, the positions and orientations of the transmitter assemblies 106 are determined which has a known position and orientation with respect to the patient.

The receiver 108 is configured to measure the magnetic signals transmitted by the transmitter assemblies 106 to determine the position and orientation of the tracked object with respect to the transmitter assemblies. The position of the tracked object can be measured as relative to any global reference point, such as the receiver 108. The computing device 102 is configured to convert the measured magnetic signals into position and orientation data. In some implementations, position data can be expressed as a position vector of position coordinates (e.g., x, y, z coordinates). In this example, the receiver 108 uses a Cartesian coordinate system (with x, y, and z coordinates) to represent a location in space; however, other types of coordinate systems (e.g., cylindrical, spherical, etc.) may be utilized.

The orientation of the tracked object refers to a direction the tracked device is facing with respect to the global reference point (e.g., the receiver 108), and can be expressed similarly by using a coordinate system and represented, for example, as a vector of orientation coordinates (e.g., azimuth ($\psi$), altitude ($\theta$), and roll ($\varphi$) angles). The transmitter assemblies 106 operate to be an up to six degree of freedom (6DoF) measurement system that is configured to allow for measurement of position and orientation information related to a forward/back position, up/down position, left/right position, azimuth, altitude, and roll. For example, if the receiver 108 includes a single receiving coil, a set of minimum of at least five transmitter assemblies 106 can provide five degrees of freedom (e.g., without roll). In an example, if the receiver 108 includes as least two receiving coils, a minimum of at least six transmitter assemblies 106 can provide enough data for all six degrees of freedom to be determined. Additional transmitter assemblies can be added to the plurality of transmitter assemblies 106 to increase tracking accuracy or allow for larger tracking volumes.

The computing device 102 comprises one or more processors and is configured to receive the position data, the orientation data, and the motion data that are measured by camera 110 of transmitter assemblies 106. The computing device 102 receives the magnetic signal from the receiver 108 and converts the magnetic signal into position data and orientation data or receiver 108. The computing device 102 can include input and output ports for sending and receiving both analog and digital data. The computing device 102 can include a waveform generator (not shown) for driving the transmitter assemblies 106. Aspects and examples of the computing device 102 are further described in relation to FIG. 7.

The computing device 102 is configured to determine one or both of the position and the orientation of the tracked object based on the received magnetic signals at receiver 108 from the transmitter assemblies 106 and from the image data from the camera 110. The computing device 102 can differentiate the position data and orientation data with a device identifier specifying the tracked object, such as for situations in which more than one object is being tracked.

The computing device 102 can include circuitry to drive the transmitter assemblies 106 and control the operation of the transmitter assemblies 106. For example, the computing device 102 can include a controller that is configured to control each of the transmitter assemblies 106. The transmitter assemblies 106 can be configured to emit magnetic signals at different times or frequencies in a measurement cycle. For example, the computing device 102 can be configured to control each of the transmitter assemblies 106 to transmit a magnetic signal at a particular time in a measurement cycle, transmit magnetic signal in a particular order, etc. to cycle through each of the transmitter assemblies 106. The receiver 108 measures each of the magnetic signals. If a timing regime is used, the computing device 102 can associate the received magnetic signal with a particular transmitter assembly based on when the magnetic signal is received by computing device 102 from the receiver 108. The controller can control the transmitter assemblies 106 using time-slice multiplexing, frequency multiplexing, and so forth.

The transmitter assemblies 106 can be calibrated individually. In some implementations, each transmitter assembly includes one or more properties that are distinct from the other transmitter assemblies of the plurality. For example, each of the transmitter assemblies 106 can be calibrated with modeled parameters, mapping of magnetic fields from the magnetic signals, spherical harmonics, closed form solutions, and so forth. The calibration data can be stored by the computing device 102. The calibration data for a transmitter assembly can be stored locally with that respective transmitter assembly on a local storage. In an aspect, the calibration data can be sent (e.g., wired or wirelessly) to the computing device 102 to assist the computing device 102 for determining the position and orientation of the transmitter assembly. As stated previously, each of the transmitter assemblies 106 can be configured to operate on a different frequency from one another, turn on at different times, and so forth.

The transmitter assemblies 106 are each configured to be modular. For example, for different applications, more transmitter assemblies 106 can be added or removed from the plurality. The control algorithm is correspondingly updated for the computing device 102 (e.g., automatically) based on a determination of how many transmitter assemblies 106 are included in the plurality. While a single transmitter assembly can provide some data about the tracked device, the magnetic tracking system 100 generally includes at least 5 transmitter assemblies to ensure five degree-of-freedom measurements are possible and at least 6 transmitter assemblies to ensure six degree-of-freedom measurements are possible.

The computing device 102 can be configured to determine the position and orientation of the tracked object in a variety of ways. For example, a least-squares solution can be used to determine the position and orientation of the receiver 108 with respect to the transmitter assemblies 106. In another example, a Kalman filter or one or more other numerical methods can be used to determine the positions and orientations of the receiver 108 with respect to the transmitter assemblies 106.

As is known in the art, a reversed configuration of the magnetic tracking system 100 described previously can be used to track the tracked object. In this example, a plurality of receiver coils with optical tracking can be paired with a miniaturized transmitter assembly. The transmitter assembly is tracked using magnetic signals received at the multiple receivers.

The user interface 104 can include a display for reporting the position and orientation of the tracked object to a user of the magnetic tracking system 100. The position and orientation that are reported to the user can be useful for assisting the user in one or more applications, such as performing a medical operation. For example, the user interface can report the position and orientation as a visual representation of the tracked object with respect to a portion of the magnetic tracking system 100, report coordinates of the tracked object, superimpose the tracked object in images captured by the camera 110, and so forth.

The user interface 104 can be configured to control operation of the transmitter assemblies 106. The user interface 104 can include one or more controls (software controls, hardware controls, etc.). The controls can be configured to enable the user to turn the transmitter assemblies 106 off or on, change the frequency of operation of one or more of the transmitter assemblies, cause a transmitter assembly to upload calibration data, and so forth.

The computing device 102, the transmitter assemblies 106, the camera 110, amplifier 112 and the user interface 104 can communicate with each other through either wired or wireless connections. For example, the transmitter assemblies 106 can be wired into ports of the computing device 102. In such a configuration, the computing device 102 can provide a power signal to drive each of the transmitter assemblies 106, and the transmitter assemblies can each include passive electronics. In another example, each of the transmitter assemblies 106 can be equipped with a data transceiver configured to wirelessly transmit data (e.g., calibration information) to the computing device and receive data (e.g., control signals) from the computing device 102.

The transmitter assemblies 106 can be rearranged during use of the magnetic tracking system 100, and the new positions and orientations of each of the transmitter assemblies can be determined by the computing device 102 using camera 110 information. For example, the transmitter assemblies 106 can be moved around during a surgery to ensure that one or more of the transmitter assemblies is within several inches of the tracked object (e.g., a catheter) while the tracked object is moved around the environment (e.g., inside the patient). Thus, the transmitter assemblies 106 are reconfigurable without requiring recalibration of the magnetic tracking system 100.

In some implementations, the transmitter assemblies 106 include adhesive patches which can be affixed to one or more surfaces of the environment of the magnetic tracking system 100. For example, the transmitter assemblies 106 can be affixed to a subject (e.g., a patient) of a medical operation. For example, as an endoscope is navigated inside a patient's body, the transmitter assemblies 106 can be unstuck from first positions and moved to second positions that are near (e.g., within 2-3 inches) the path of the endoscope. In some implementations, the transmitter assemblies 106 can be placed on the skin of a patient directly over the surgical area. If imaging is required for the surgical area, the patches including the transmitter assemblies 106 can be removed, the images captured, and the patches replaced, without recalibration of the magnetic tracking system 100.

Figure 1B:
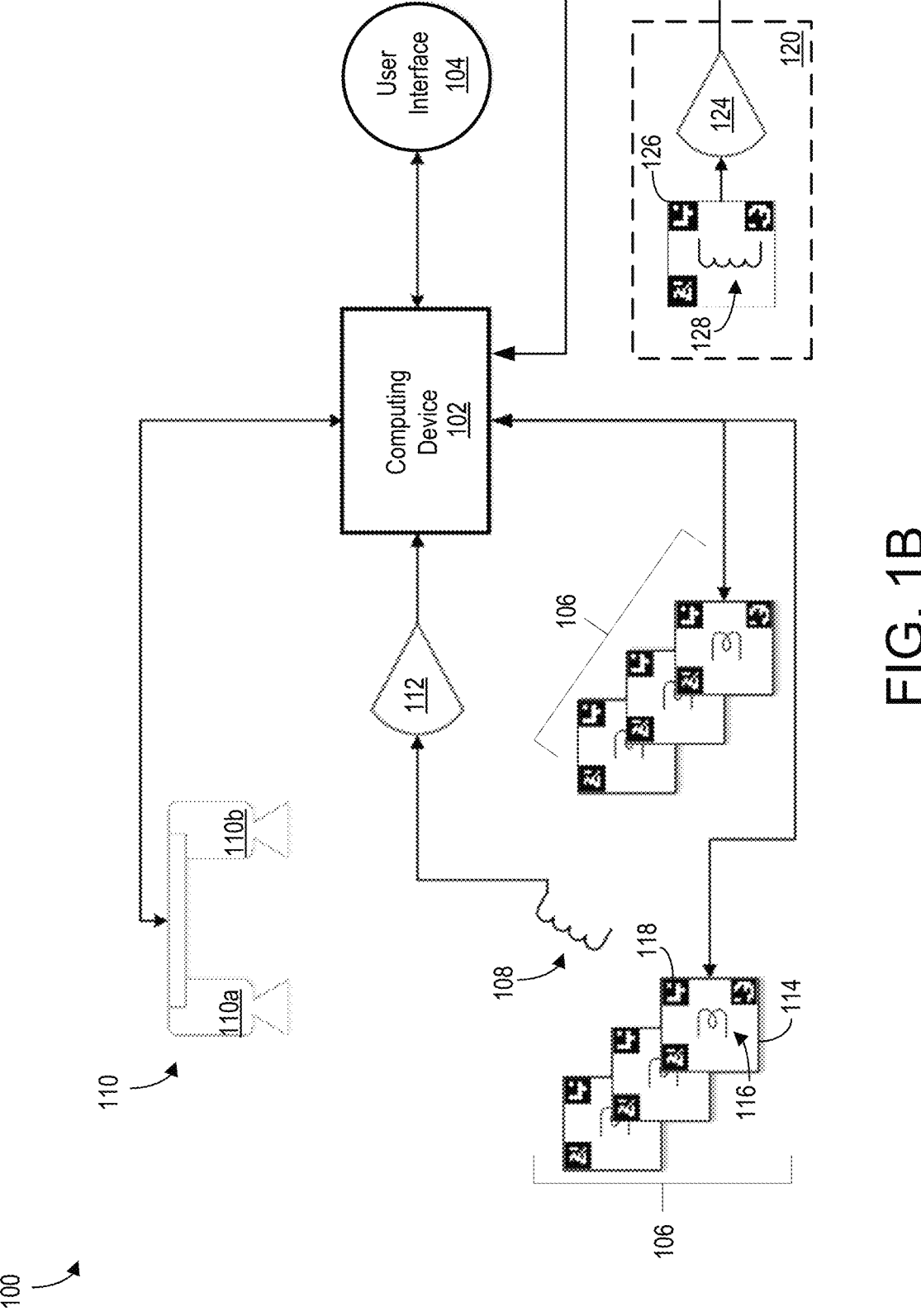

Turning to FIG. 1B, an example of the magnetic tracking system 100 is shown including a reconfigurable receiver assembly 120 in addition to the reconfigurable transmitter assemblies 106. The receiver assembly 120 is configured to detect the signals emitted by the transmitter assemblies 106 in a similar manner as receiver 108 for tracking the tracked object. The position of the receiver assembly 120 (or plurality thereof) on or near the patient can enable the magnetic tracking system 100 to determine the magnetic distortion of the magnetic field that is emitted by the transmitter assemblies 106. The measured magnetic field(s) at one or more positions on or near the patient can be compared to the optical position(s) and orientation(s) of the receiver assemblies 120 to estimate the distortion of the magnetic field close to the tracked object. The position and orientation of the transceiver that emitted the signal and the position of the receiver are both optically measurable from the images of the camera 110. As a result, the computing device 102 can compute a compensation metric (e.g., an error value) for each transmitter assembly. A magnetic distortion map can be generated for the system 100, improving the accuracy of the estimation of the position of the tracked object. In some implementations, signals generated by transmitter assemblies 106 that are too close to the receiver assembly 120 (e.g., within 2 inches, within 5 inches, within 10 inches, etc.) can be ignored or filtered for determining distortion. This is because these signals may saturate the receiver 120.

The receiver assembly 120 includes a receiving coil 128, similar to receiver 108. The receiver assembly 120 can include electronics for processing the received signal, such as an amplifier 124. Similar to the transmitter assemblies 106, the receiver assembly 120 includes optical markings 126 including icons, markings, or something otherwise optically distinguishable in images captured by the camera 110. The computing device 102 recognizes the receiver assembly 120 in the images of the camera 110. The computing device 102 is configured to determine the position and the orientation of the receiver assembly 120 based on the markings, shape, or other optical property of the receiver assembly 120 in a manner similar to the transmitter assemblies 106. The receiver assembly 120 can be wired or wireless. The receiver 120 can include additional electronics such as a battery, memory, a data transmitter, and so forth.

The receiver 120 can measure the magnetic field signal emitted by each of the transmitter assemblies 106. While a coil is shown in FIG. 1B, in some implementations, the receiver assembly 120 can include one or more other sensing devices, such as a magnetometer on an integrated circuit, a gradiometer, and so forth. In some implementations, a plurality of coils 128 can be included on each receiver assembly 120. Each sensor coil can have known magnetic properties, or the system 100 can be calibrated to reduce sensor-specific error. For example, the calibration data can be stored local to each receiver 120 at a memory (e.g., memory 308 of FIGS. 3C-3D). In some implementations, the received signal can be processed locally (e.g., by processing device 304 of FIGS. 3C-3D), and the processed signal can be sent to the computing device 102.

In some implementations, multiple transmitter assemblies 106 and receiver assemblies 120 can be connected together to form a larger assembly. For example, a rigid flex assembly or interconnected/daisy chained configuration can be used. For example, each of the transmitter assemblies 106 and receiver assemblies 120 can be connected, either wired or wirelessly, into an array of additional transmitters and/or receivers of the magnetic tracking system 100. In some implementations, a transmitter and a receiver can co-exist on a single assembly (e.g., a single assembly 106 or 120). In such a configuration, the transmitter on the assembly may deactivate while the receiver is active to avoid saturation of the receiver.

The combination of the receiver assemblies 120 and the transmitter assemblies 106 can be a distortion indicator or distortion mapping system for the environment. The magnetic tracking system 100 can use a determined difference between optical determination of the optical pose of each of assemblies and the EM determination of pose as an indication of distortion present in the environment. The magnetic tracking system 100 can thus perform distortion compensation. For example, data collected by external the receiver assemblies 120, including magnetic field measurements and pose, distorted data, optical data (truth), and gradient data (estimated by differences in fields as sensor move) can be used to make corrections for distortion. The distortion can be modeled using physical models. These models can include curve-fitting (e.g., for magnetic signals and for pose solutions), splines, triangulations, radial basis functions, and using machine learning methods.

The receiver assemblies 120 can be placed where needed during an operation and moved/adjusted easily during the operation. For example, the receiver assemblies 120 can be moved minimize interference of X-rays during an operation. The receiver assemblies 120 can be placed along catheter/guidewire path to have continuous distortion indication and/or compensation over the tracking volume. The receiver assemblies are placed on the patient body, close to the working tracking volume. Similar to the transmitter assemblies 106, the receiver assemblies 120 can be rechargeable (wired or wirelessly) and/or disposable.

The receivers of the receiver assembly 120 can be associated with memory configured to store calibration data for the receivers, similar to the calibration data of the transmitters. The calibration data can be updated based on the determined distortions in the environment, due to hardware variances for each of the receivers, and so forth.

The receiver assembly 120 can be positioned on or near the patient for tracking the tracked object. In some implementations, a plurality of receiver assemblies including receiver assembly 120 can be used. As described above, five or six degrees of freedom (DoF) for the tracking system 100 can be achieved depending on how many receiver assemblies and transmitter assemblies are being used in the magnetic tracking system. The receiver assembly 120 is subsequently described in more detail in relation to FIG. 2B and FIGS. 3C-3D.

Turning to FIG. 2A, an example of a transmitter assembly 200 (e.g., of transmitter assemblies 106 of FIGS. 1A-1B) that is a part of the magnetic tracking system 100 is shown. The transmitter assembly 200 is configured to be simple, low-cost, and modular. The transmitter assembly 200 includes a first side 202 and a second side 204. In some implementations, an adhesive patch 206 can be added to a side (such as the first side 202) to form a stack 212. For different applications of the magnetic tracking system 100, the first side 202 is generally a bottom side that faces away from the camera 110. The second side 204 is generally a top side that is observable in images captured by the camera 110.

The first side 202 of the transmitter assembly 200 can include a bottom surface of the transmitter assembly. The first side 202 of the transmitter assembly 200 includes a transmitting coil 210 (which is substantially similar to coil 116 described in relation to FIGS. 1A-1B). The coil 210 can emit a magnetic signal that is received by a receiver (e.g., receiver 108) of the magnetic tracking system 100.

The second side 204 of the transmitter assembly 200 can include a top side of the transmitter assembly that is exposed to the camera 110 of the magnetic tracking system 100. The second side 204 generally includes one or more markers, such as icons 208a, 208b, and 208c (collectively icons 208). The icons 208 can each be distinct from one another so that the computing device 102 can discriminate between the icons. The positions of the icons 208 relative to one another indicate to the computing device 102 what the position and orientation of the transmitter assembly 200 is relative to the camera 110, receiver 108, or other portion of the magnetic tracking system 100. For example, if icon 208b appears in a positive direction along a y-axis with respect to icon 208c, the computing system can determine that the transmitter assembly 200 is rotated at a particular yaw value (e.g., planar rotation with respect to the camera 110). Alternatively, computer vision or machine learning methods may be used to track the transmitter assembly 200, as is known in the art. The icons 208 can be selected from a library of icons which the computing device 102 is configured to recognize and assign to different transmitter assemblies of the plurality. For example, the computing device 102 can identify a particular transmitter assembly 200 based on which icons 208 are on the transmitter assembly. The computing device 102 associates a received magnetic signal with that transmitter assembly 200, assisting in position and orientation calculations. In other words, the computing device 102 uses the icons 208 to know which transmitter assembly 200 is associated with which magnetic signal, even after the transmitter assemblies 106 are reconfigured. The computing device 102 can then determine an updated position and orientation of the transmitter assemblies 106 and thus the tracked object.

The camera device 110 can include stereoscopic cameras which provide distance information to the computing device 102. The computing device 102 can use the distance information (whether determined at the camera device 110 or calculated at the computing device 102) to determine the position of the transmitter assembly 200 in three dimensions. The camera device 110 can include a single camera which can determine distance based on the use of multiple icons 208 and their known geometry, such as the distance D1 between the icons 208a and 208b, and distance D2 between the icons 208b and 208c.

The transmitter assembly 200 includes icons 208a, 208b, and 208c for determining the pose of the transmitter assembly 200. The icons 208 are generally configured to be recognized for computer vision recognition. The icons can include any images, such as bar codes, QR codes, symbols, and so forth. In the example of transmitter assembly 200, the icons 208 are pixelated symbols. While three icons are included in this example, additional icons can be added for determining pose. In addition to being icons, the transmitter assembly 200 can include other means of marking the transmitter assembly 200. For example, a marker can include a retroreflector configured for infrared excitation.

The transmitter coil 210 is configured to produce a magnetic signal that is received by the receiver 108. The coil 210 can emit a signal (e.g., magnetic field) that is unique to the particular transmitter assembly 200. For example, the transmitter assembly 200 may modulate the magnetic signal with a particular frequency. The coil 210 can be a single or multi-turn coil. The coil 210 can include any geometric shape capable of generating a magnetic field when supplied with an electric current. The coil 210 can be a part of circuitry of the transmitter assembly 200 (e.g., a printed circuit board (PCB), or the coil can be separately attached to the transmitter assembly 200.

The transmitter assembly 200 can include a stack 212 of layers, such as the first side 202 and second side 204, which can form first and second layers, respectively. The transmitter assembly 200 can include an adhesive layer 206 which is applied to the first side (e.g., the coil side) of the transmitter assembly 200. The adhesive layer is configured to adhere the transmitter assembly 200 to another surface, such as a patient's skin. The surface is not required to be flat or regular. The adhesive layer 206 can include an adhesive gel, glue, suction cups, or other adhesive surface. The adhesive layer 206 is generally configured to be removable and reapplied to a surface repeatedly. The adhesive layer 206 does not obscure the second side 204 that includes the icons 208.

The transmitter assembly 200 may not include active circuitry. The coil 210 can be driven from a remote source, such as a waveform generator of the computing device 102. The transmitter assembly 200 can be configured to be plugged into the computing device 102 (or another device) to drive the magnetic signal. In some implementations, the transmitter assembly 200 can be configured to connect to one or more other transmitter assemblies, such as in a daisy-chain formation. In another example, the transmitter assembly 200 can be connected in parallel with one or more other transmitter assemblies.

Turning to FIG. 2B, different views are shown of a receiver assembly 220 (e.g., the receiver assembly 120 of FIG. 1B). A top view of the receiver assembly 220 shows an upper surface 230 of the receiver assembly Similar to the transmitter assembly 200 of FIG. 2A, the receiver assembly 220 can include optical markings 226 for distinguishing a particular receiver assembly from other receiver assemblies and/or transmitter assemblies. The receiver assembly 220 can include one or more receiving sensors, such as coils L1, L2, and L3. More coils can increase the number of degrees of freedom of the measurement.

A perspective view of the receiver assembly 220 is shown including layers 224 and 230. The layer 224 can be a backing layer that is configured to adhere to another surface, such as an operating table or the patient. Layer 230 includes the markings 226 and the receivers 222. In some implementations, the receiver assemblies 220 include no active circuitry. However, as subsequently described in relation to FIGS. 1B and 3C-3D, the receiver assembly 220 can include active circuitry.

Figure 3A:
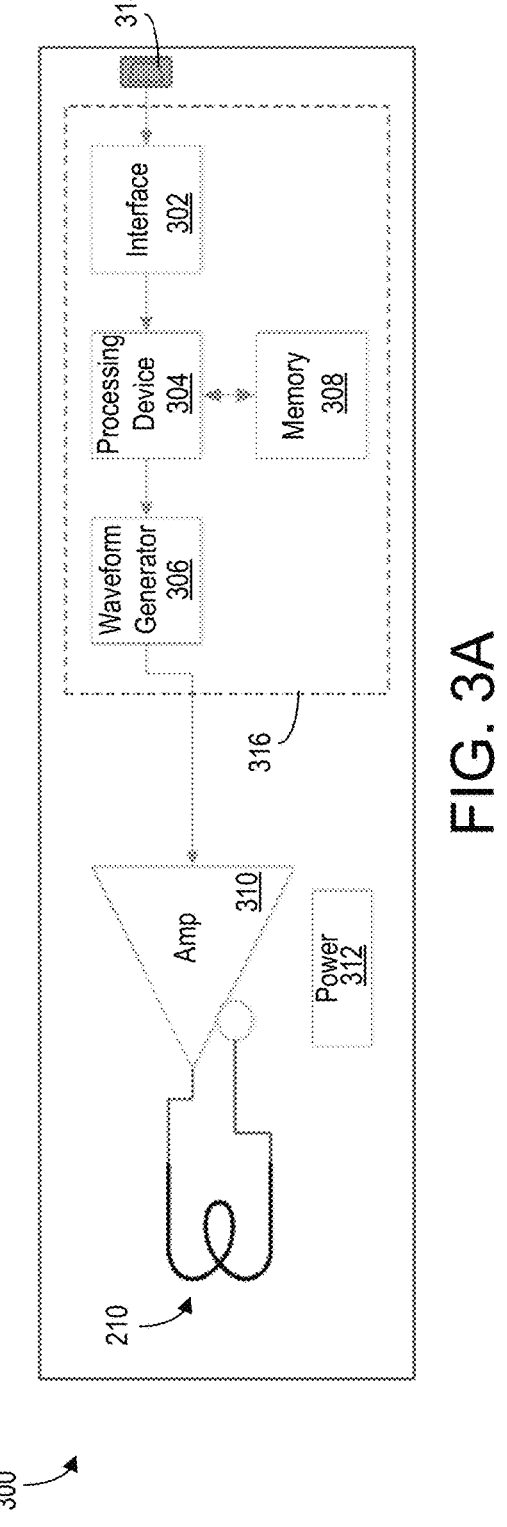
FIGS. 3A-3B show block diagrams of example transmitter assemblies.
Figure 3B:
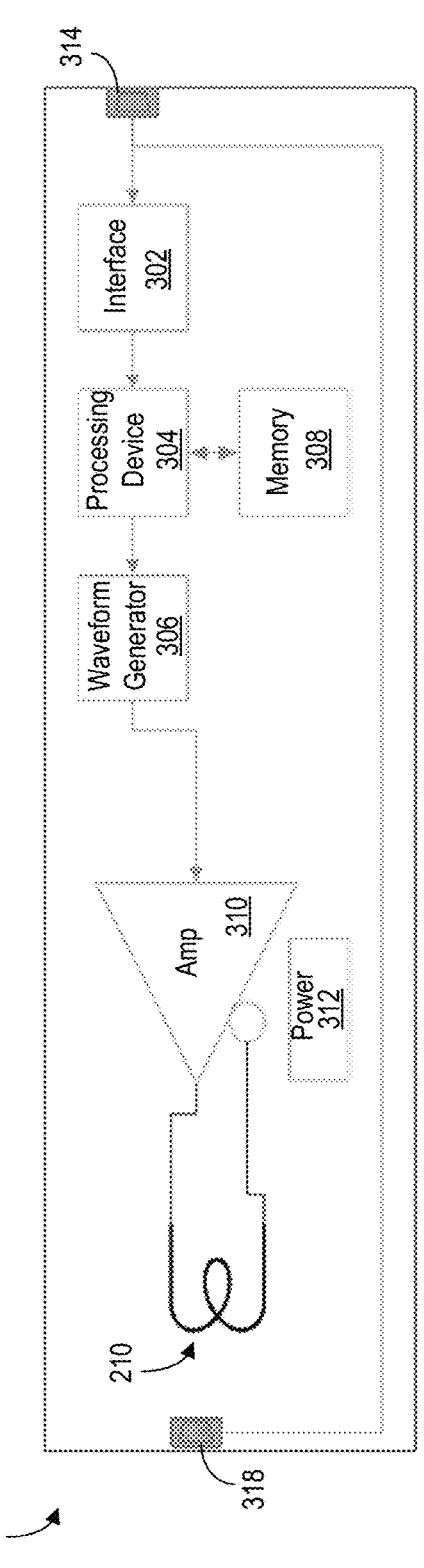

Turning to FIGS. 3A-3B, block diagrams of example transmitter assemblies are shown. The block diagrams show the electronics that can be included in the transmitter assemblies 106 described in relation to FIGS. 1A-2A.

In FIG. 3A, an example of transmitter assembly 300 electronics is shown. The electronics of the transmitter assembly can include active electronics. For example, the transmitter assembly can include its own processing device 304, a waveform generator 306, memory 308, and an interface 302 for sending and receiving data, such as through a connector 314. A system-on-a-chip 316 can combine the waveform generator 306, the processing device 304, the interface 302, and the memory 308 into a single block that can be added or removed from a transmitter assembly. As previously described, in some implementations, the electronics of block 316 can be included in the computing device 102.

The processing device 304 can be configured to control the transmitter assembly 300. The processing device 304 can control the waveform generator 306, the interface 302, and the memory 308. The processing device 304 is configured to communicate with the computing device 102 and/or other transmitter assemblies.

The memory 308 is configured to store data that is local to the transmitter assembly 300. For example, the memory 308 can store calibration data related to the transmitter assembly 300. In some implementations, the memory 308 can store instructions for the processing device 304.

The waveform generator 306 is configured to drive the coil 210 of the transmitter assembly 300. The frequency and amplitude of the magnetic signal are set from the processing device 304. The waveform generator 306 generates an electric current configured to cause the desired magnetic signal from the coil 210. The waveform generator 306 sends the generated signal through an amplifier 310, which amplifies the signal and sends the current signal to the coil 210. The coil 210 generates a magnetic signal (e.g., magnetic field) from the coil. The waveform generator 306 can be configured to generate any waveform required for generating a magnetic signal, such as sine waves, pulsed direct current (DC) waves, quadratic waves, etc.

The transmitter assembly 300 can include a power source 312. The power source provides local power to the devices of block 316 as well as the amplifier. The power source can include a battery, such as a button battery, or any other such power source. The power source 312 can be rechargeable (wired or wirelessly). In some implementations, the power source 312 is configured for one-time use before discarding the power source. In some implementations, transmitter assembly 300 is configured for one-time use before discarding, assuming it is not cost prohibitive.

The interface 302 is configured for either wired or wireless communication with other transmitter assemblies 106 and the computing device 102. In some implementations, the interface is configured to transmit or receive instructions to and from the transmitter assembly 300.

Turning to FIG. 3B, a variant 320 of transmitter assembly 300 is shown. The transmitter assembly 320 includes an additional connector 318. The connectors 314, 318 can connect the transmitter assembly 320 to other transmitter assemblies and the computing device 102 (or other portions of the magnetic tracking system 100). The connector 314 is connected with a pass-through connection to connector 318. This allows for daisy-chaining multiple transmitter assemblies 320 together. In some implementations, the electronics of block 316 (which can alternatively not be a part of a same chip) can be excluded from the transmitter assembly 320, and common electronics can be used to power, control, and drive the magnetic signal for each of the transmitter assemblies 106. Such a configuration is shown in FIG. 4.

Figures 3C, 3D:
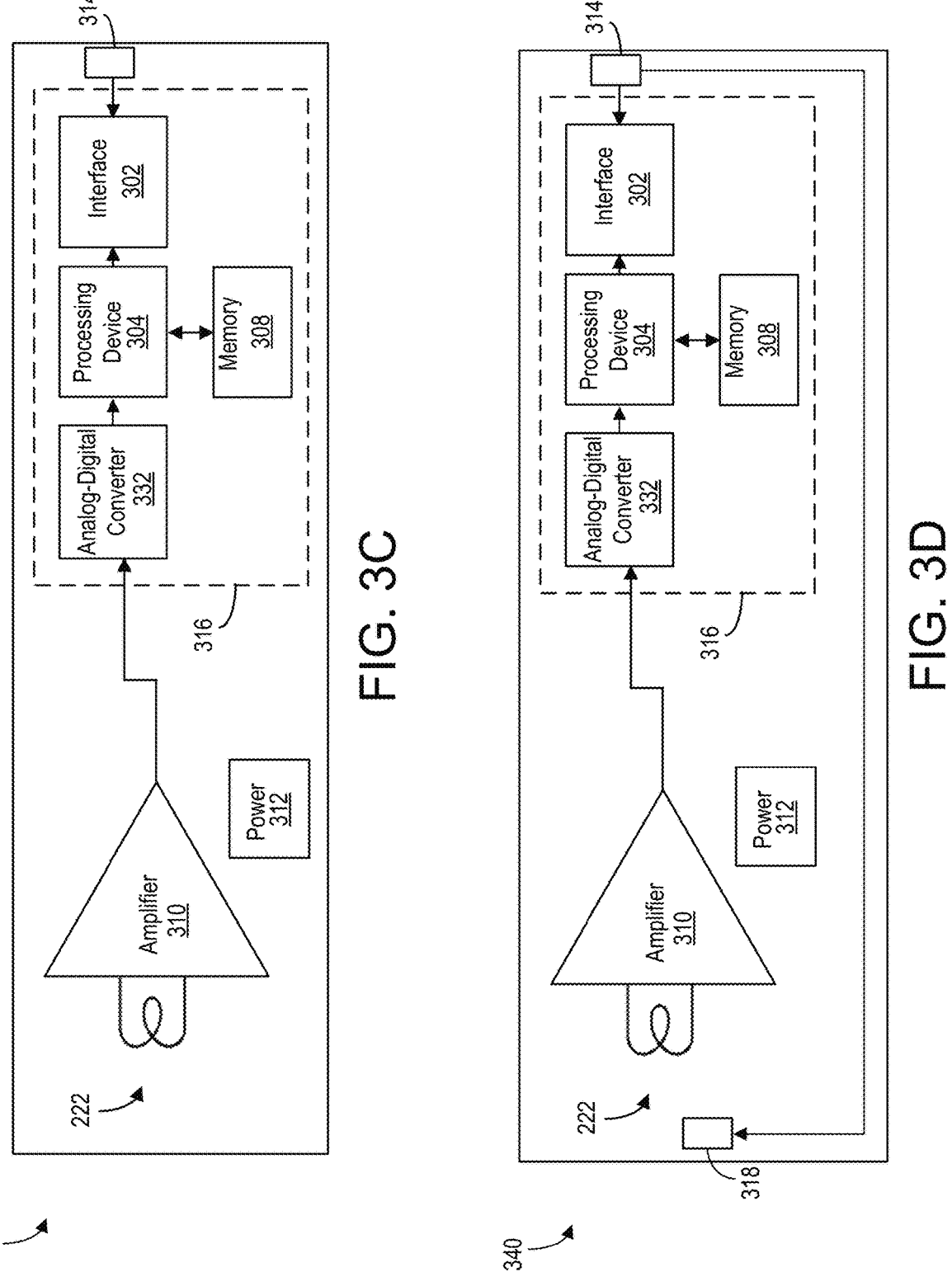
FIGS. 3C-3D show block diagrams of example receiver assemblies.

Turning to FIGS. 3C-3D, block diagrams of example receiver assemblies 330, 340 are shown. The block diagrams show the electronics that can be included in the receiver assemblies 120 described in relation to FIGS. 1B and 2B. The interface 302, processing device 304, memory 308, amplifier 310, and power source 312 can all function in a similar manner as described in relation to the transmitter assemblies 300, 320 of FIGS. 3A-3B. The receiver assemblies 330, 340 can each include an analog-digital converter 332, which is configured to convert the analog magnetic signal measured by the receiver coil 222 to a digital signal suitable for processing by the processing device 304. Like the transmitter assemblies 300, 320, the receiver assemblies can be connected using connectors 314, 318. In some implementations, a plurality of receivers 340 can be connected together (e.g., in a daisy-chain configuration). The connectors 314, 318 can allow the receive assemblies 330, 340 to communicate to one another. Additionally, the connectors 314, 318 allow simple connecting and disconnecting so that each receiver assembly is modular with the other receiver and transmitter assemblies and the computing device 102. The assemblies 330, 340 can be connected and disconnected for debugging, ease of connection, disposability, and other such purposes. In some implementations, connected assemblies 330, 340 can have a common electronics unit for processing, wireless and memory capabilities.

Figure 4:
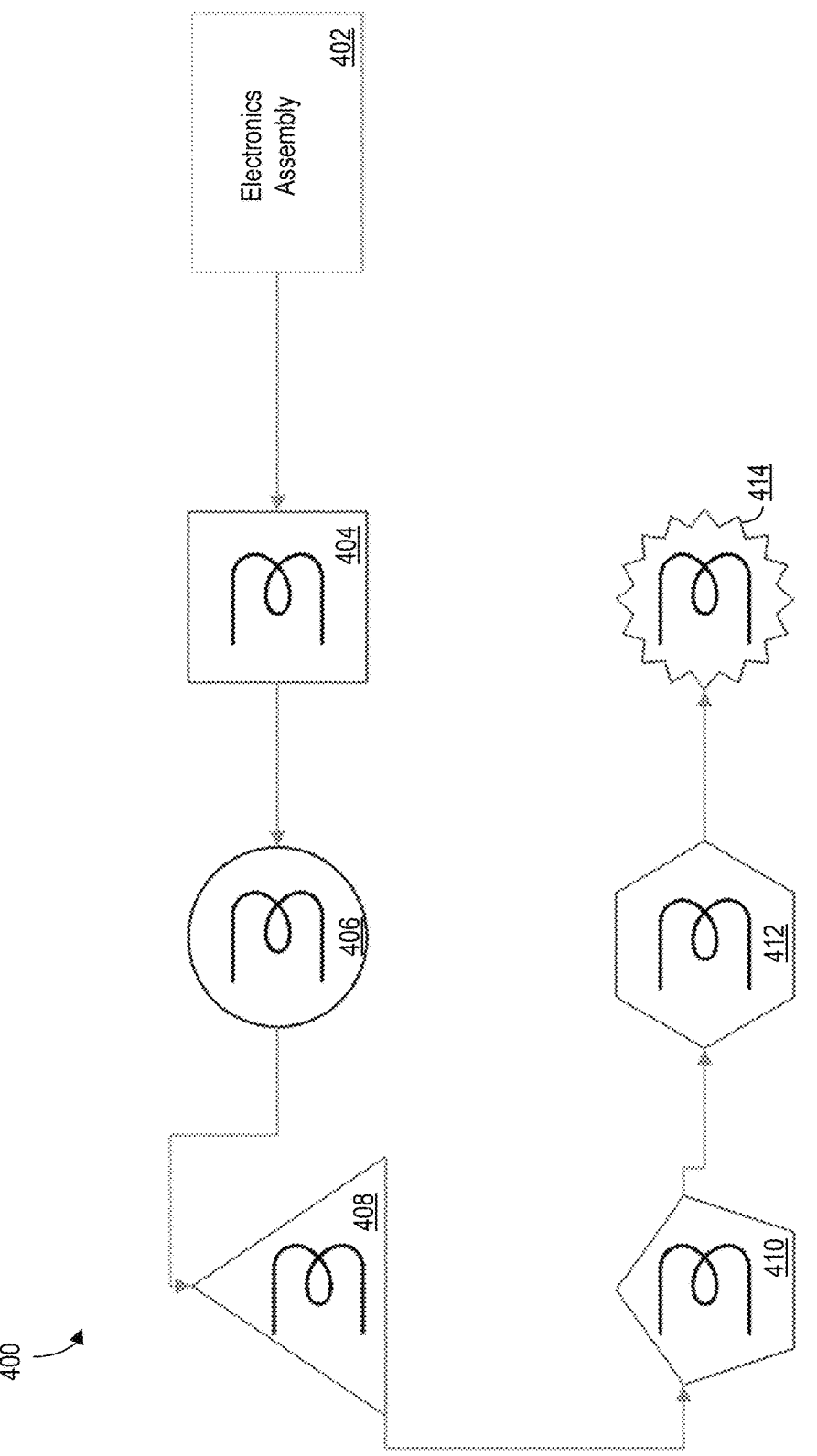
FIG. 4 shows a block diagram of an example transmitter array assembly with various transmitter assemblies.

Turning to FIG. 4, a block diagram is shown of an example transmitter array 400 with various transmitter assemblies 404, 406, 408, 410, 412, and 414. The transmitter assemblies of the array 400 can be controlled, powered, and driven by a single electronics assembly 402. In some implementations, the electronics assembly is a part of the computing device 102 described in relation to FIGS. 1A-1B.

The array 400 includes a plurality of transmitter assemblies 106 which are connected together. The transmitter assemblies 106 can be daisy chained together, as shown in FIG. 4, or connected in parallel to the electronics assembly 402. In some implementations, the array includes a rigid, flex assembly. In some embodiments, the transmitter assemblies 106 are wirelessly connected into the array 400.

In addition to or as an alternative to the icons 208 of FIG. 2A, each of the transmitter assemblies 404, 406, 408, 410, 412, and 414 can have a unique geometry (e.g., shape) to distinguish the particular transmitter assembly from the other transmitter assemblies of the array. For example, the transmitter assembly 404 is a square shaped, the transmitter assembly 406 is a circle, the transmitter assembly 408 is a triangle, and so forth. The camera device 110 and computing device 102 are configured as described above to determine the pose of each of the transmitter assemblies 404, 406, 408, 410, 412, and 414 in a similar manner.

Figure 5:
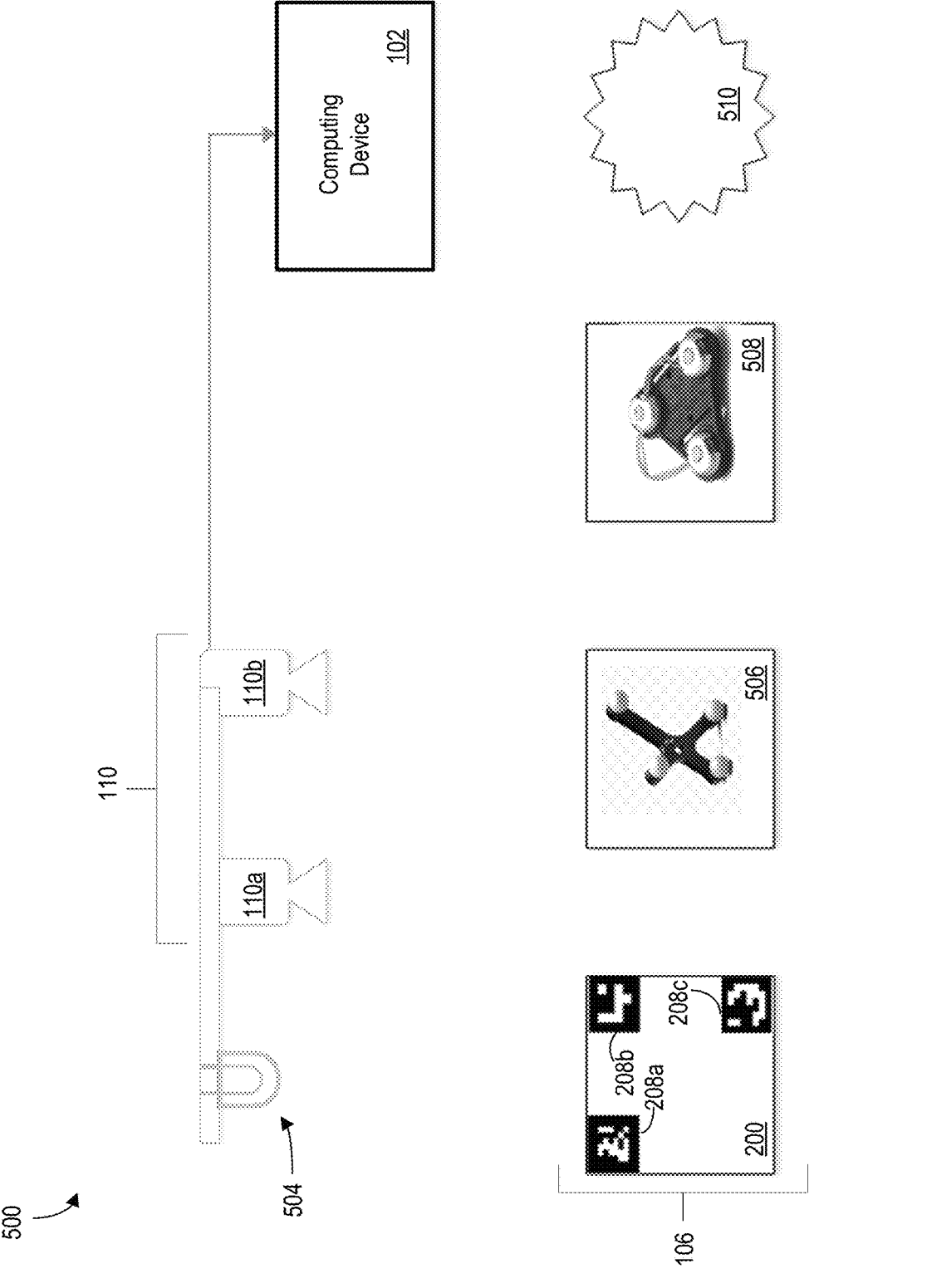
FIG. 5 shows a block diagram of an example magnetic tracking system including different types of transmitter assemblies.

FIG. 5 shows a block diagram of an example magnetic tracking system 500 including different types of transmitter assemblies and a camera device 110. The magnetic tracking system 500 is similar to magnetic tracking system 100 described in relation to FIGS. 1A-1B. In the magnetic tracking system 500 of FIG. 5, the camera device 110 is configured to capture images of different kinds of transmitter assemblies, such as transmitter assembly 200, transmitter assembly 506, transmitter assembly 508, and transmitter assembly 510.

The camera 110 is configured to track all the transmitter assemblies 106 of the plurality, as described previously. The images from the camera device 110 can provide information to the computing device 102 to identify which transmitter assemblies 106 are part of the active system. The computing device 102 can use the images of the camera device 110 to track the movement of each of the transmitter assemblies 106 and automatically adjust a tracking algorithm. For example, movement of the transmitter assemblies 106 due to respiration of a patient to which the transmitter assemblies are affixed can be accommodated. For example, the computing device 102 can determine that the transmitter assemblies 106 are moving in a pattern and correct the pose estimation so that the transmitter assemblies 106 are considered static. Cyclical motion, motion following a pattern, or movement smaller than a threshold can each be corrected using prediction and correction algorithms. If too much movement is detected, an alert can be sent to the user interface 104 informing the user that the tracking of the transmitter assemblies 106 might have errors.

As previously described, the markers of each transmitter assembly 200, 506, 508, and 510 can vary, as long as they distinguish the respective transmitter assembly from the other transmitter assemblies of the plurality. Additionally, the transmitter assemblies 200, 506, 508, and 510 generally each convey enough information that a pose can be determined from images or other measurement data of the transmitter assemblies. For example, the markers can include ArUco or ChArUco patterns 208*a*, 208*b*, and 208*c*. For example, the markers can include passive retroreflectors that respond to infrared (IR) excitation from an IR source 504 near the camera aperture(s) 110*a* and 110*b*. The transmitter assemblies 106 can include active markers that transmit light signals, radio frequency data, ultrasound signals, or other pose information. As described in relation to FIG. 4, the shapes of the transmitter assemblies 106 themselves can be used for pose determination, such as for transmitter assembly 506.

Turning to FIG. 6, a flow diagram of a process 600 for performing magnetic tracking with the magnetic tracking systems and transmitter assemblies of FIGS. 1A-5 is shown. The process 600 represents how a magnetic tracking system (e.g., magnetic tracking system 100 of FIGS. 1A-1B) is configured for determining an object pose of a tracked object in an environment of the magnetic tracking system. The magnetic tracking system 100 includes a plurality of transmitter assemblies. Each transmitter assembly includes a transmitting coil configured to generate a magnetic signal for the transmitter assembly. The received magnetic signal is indicative of an object pose of a tracked object with respect to the transmitter assembly. Each transmitter assembly includes a marker that visually identifies a pose of the transmitter assembly with respect to a camera device. The camera device is configured to capture at least one image of the plurality of transmitter assemblies that includes a representation of the marker on each of the transmitter assemblies.

A camera is configured to capture (602) an image of the plurality of transmitter assemblies. The process 600 includes determining (604), by a computing device (e.g., computing device 102 of FIGS. 1A-1B), based on the image including the representation of the marker on each of the transmitter assemblies, a pose for each of the transmitter assemblies in the image. The computing device 102 is configured to receive (606) each of the magnetic signals from the receiver. The computing device 102 is configured to determine (608), based on each of the magnetic signals and the pose associated with each of the transmitter assemblies, the object pose of the tracked object in the environment. The computing device is configured to output (610) a representation of the object pose, such as to a user interface.

In some implementations, at least one transmitter assembly of the plurality of transmitter assemblies is configured for being moved from a first position in the environment to second position in the environment during operation of the magnetic tracking system, and wherein the computing device is configured to update a pose associated with the transmitter assembly.

Generally, the marker comprises at least three icons at pre-determined distances from each other. The marker for a transmitter assembly can include an outer shape of the transmitter assembly, the outer shape being distinct from other outer shapes of the other transmitter assemblies of the plurality. The marker can include an infrared retroreflector, and wherein the camera device comprises an infrared source.

Generally, at least one transmitter assembly of the plurality includes a memory configured to store calibration data related to the transmitter assembly, a processing device configured to control transmission of the magnetic signal from the transmitter assembly, a communication interface for sending and receiving data from the computing device or other transmitter assemblies of the plurality, and a power source configured to provide electrical power to the memory, the processing device, and the communication interface.

In some implementations, at least one transmitter assembly of the plurality is configured to wireless communicate with the computing device. In some implementations, at least one transmitter assembly of the plurality comprises an adhesive configured to removably affix the transmitter assembly to another surface in the environment. As stated previously, the tracked object can include one of a catheter, an endoscope, or a surgical instrument.

In an aspect, the computing device is configured to control the plurality of transmitter assemblies to generate the magnetic signals. Controlling the plurality of transmitter assemblies can include performing a time-slice multiplexing of each of the transmitter assemblies, the time-slice multiplexing causing each of the transmitter assemblies of the plurality to transmit the magnetic signals at different times in a sequence. Controlling the plurality of transmitter assemblies can include performing a frequency multiplexing of each of the transmitter assemblies, the frequency multiplexing configured to cause each of the transmitter assemblies of the plurality to transmit the magnetic signals at different frequency values.

In an aspect, the plurality of transmitter assemblies are connected to the computing device in parallel. In an aspect, the plurality of transmitter assemblies are connected to the computing device in sequence.

In some implementations, at least one transmitter assembly of the plurality of transmitter assemblies is modular. The computing device is configured to update a tracking algorithm in response to detecting that the modular transmitter assembly has been removed.

The transmitter assembly can include a transmitting coil configured to generate a magnetic signal in response to receiving an electric current, a first surface comprising at least one marker, the at least one marker configured to identify a pose of the transmitter assembly with respect to a camera device, and a second surface configured to removably affix to another object. In an aspect, the transmitter assembly includes memory configured to store calibration data related to the transmitter assembly, a processing device configured to control transmission of the magnetic signal from the transmitter assembly, a communication interface for sending and receiving data to a remote device, and a power source configured to provide electric power for the memory, the processing device, and the communication interface. In some implementations, the communication interface is configured to wirelessly communicate with the remote device. In some implementations, the power source is rechargeable.

In some implementations, the marker comprises one of an ArUco pattern, a ChArUco pattern, an infrared retroreflector, a light source, an ultrasonic source, a radio signal source, and an outer shape of the transmitter assembly.

Figure 7:
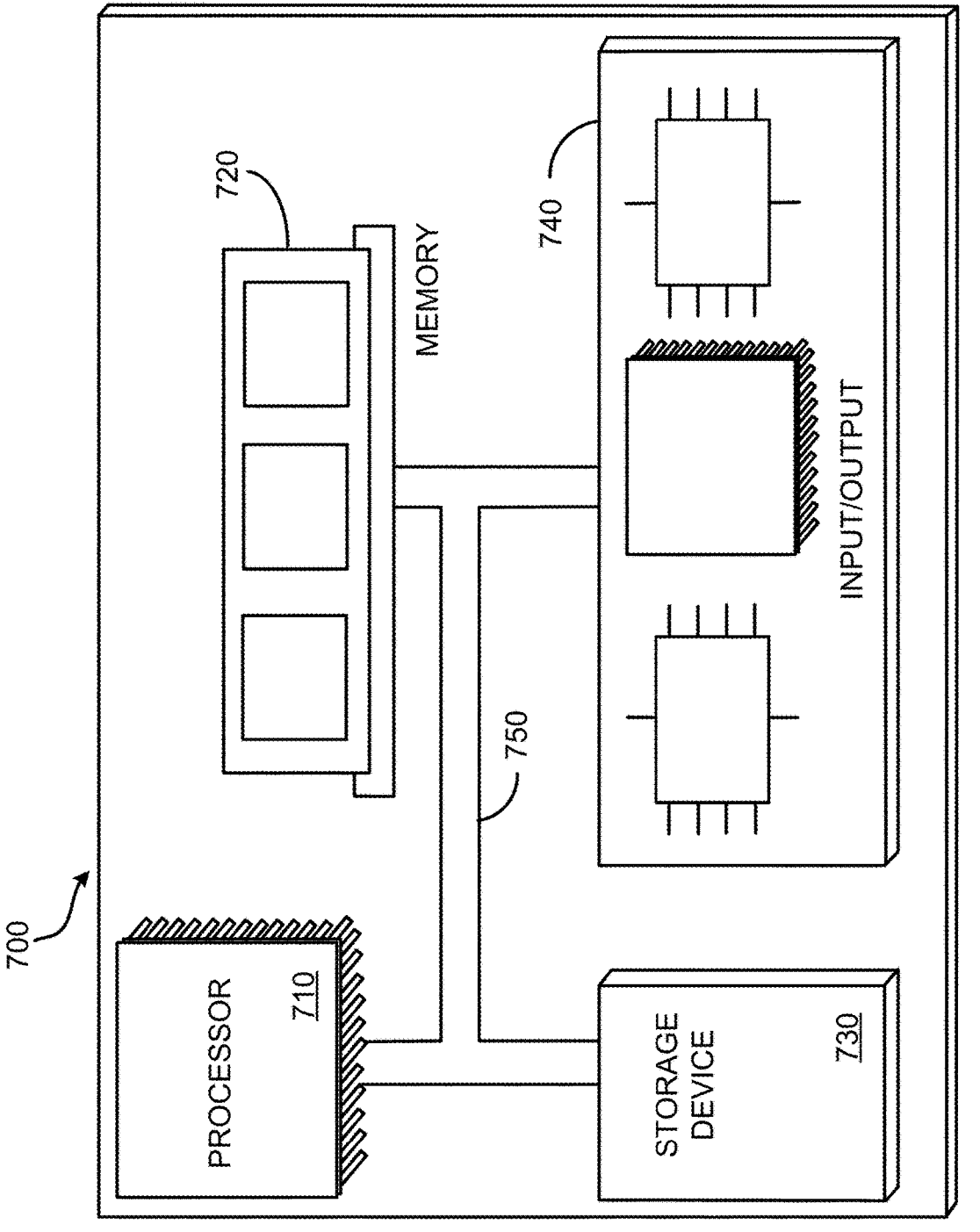
FIG. 7 is a block diagram of an example computer system.

FIG. 7 is a block diagram of an example computer system 700. The computing device 102 of FIGS. 1A-1B may be an example of the computer system 700 described here. The system 700 can include a processor 710, a memory 720, a storage device 730, and an input/output device 740. Each of the components 710, 720, 730, and 740 can be interconnected, for example, using a system bus 750. The processor 710 is capable of processing instructions for execution within the system 700. The processor 710 can be a single-threaded processor, a multi-threaded processor, or a quantum computer. The processor 710 is capable of processing instructions stored in the memory 720 or on the storage device 730. The processor 710 may execute operations such as causing the EMT system 100 to determine the position and/or the orientation of tracked device 102.

The memory 720 stores information within the system 700. In some implementations, the memory 720 is a computer-readable medium. The memory 720 can, for example, be a volatile memory unit or a non-volatile memory unit.

The storage device 730 is capable of providing mass storage for the system 700. In an aspect, the storage device 730 is a non-transitory computer-readable medium. The storage device 730 can include, for example, a hard disk device, an optical disk device, a solid-date drive, a flash drive, magnetic tape, or some other large capacity storage device. The storage device 730 may alternatively be a cloud storage device, e.g., a logical storage device including multiple physical storage devices distributed on a network and accessed using a network. In some implementations, the information stored on the memory 720 can also or instead be stored on the storage device 730.

The input/output device 740 provides input/output operations for the system 700. In some examples, the input/output device 740 includes one or more of network interface devices (e.g., an Ethernet card), a serial communication device (e.g., an RS-232 10 port), and/or a wireless interface device (e.g., a short-range wireless communication device, a 602.11 card, a 3G wireless modem, or a 4G wireless modem). Generally, the input/output device 740 includes driver devices configured to receive input data and send output data to other input/output devices, e.g., a keyboard, a printer, and display devices. In some implementations, mobile computing devices, mobile communication devices, and other devices are used.

The system 700 can include a microcontroller. A microcontroller is a device that contains multiple elements of a computer system in a single electronics package. For example, the single electronics package could contain the processor 710, the memory 720, the storage device 730, and input/output devices 740.

Although an example computer system has been described in FIG. 7, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "computer system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

A number of embodiments have been described. Nevertheless, it will be understood that various modifications may be made without departing from the spirit and scope of the subject matter described herein. Other such embodiments are within the scope of the following claims.

What is claimed is:

1. A transmitter assembly for generating a magnetic signal, comprising:
   a transmitting coil configured to generate a magnetic signal in response to receiving an electric current;
   a first surface comprising a set of icons, an icon of the set being separated from another icon of the set by a known distance, the set of icons configured to identify a pose of the transmitter assembly with respect to a camera device and distinguish the transmitter assembly from one or more other transmitter assembly; and
   a second surface configured to removably affix to another object.

2. The transmitter assembly of claim 1, further comprising:

a memory configured to store calibration data related to the transmitter assembly;

a processing device configured to control transmission of the magnetic signal from the transmitter assembly;

a communication interface for sending and receiving data to a remote device; and a power source configured to provide electric power for the memory, the processing device, and the communication interface.

3. The transmitter assembly of claim 2, wherein the communication interface is configured to wirelessly communicate with the remote device.

4. The transmitter assembly of claim 2, wherein the power source is rechargeable.

5. The transmitter assembly of claim 2, wherein the first surface comprises one of an ArUco pattern, a ChArUco pattern, an infrared retroreflector, a light source, an ultrasonic source, a radio signal source, and an outer shape of the transmitter assembly.

6. The transmitter assembly of claim 1, wherein the marker set of icons comprises three distinct icons.

7. The transmitter assembly of claim 1, wherein the outer shape of the transmitter assembly is uniquely identifying of the transmitting assembly.

8. The transmitter assembly of claim 1, wherein the first surface comprises an infrared retroreflector.

9. The transmitter assembly of claim 1, wherein the adhesive layer comprises suction cups.

10. The transmitter assembly of claim 1, wherein the set of distinct icons comprises at least three distinct icons, the at least three distinct icons being spaced apart wherein there is a first known distance between a first distinct icon and a second distinct icon of the at least three distinct icons, and wherein a second known distance between the second distinct icon and a third distinct icon of the at least three distinct icons.

11. The transmitter assembly of claim 10, wherein each of the first distinct icon, the second distinct icon, and the third distinct icon comprises a QR code, each having a different design from one another.

12. The transmitter assembly of claim 1, further comprising an adhesive layer that is configured to adhere the transmitter assembly to a patient's skin.

13. The transmitter assembly of claim 1, wherein the transmitter assembly is connectable to one or more other transmitter assemblies in a daisy-chain formation.

14. The transmitter assembly of claim 1, further comprising a glue.

15. The transmitter assembly of claim 1, further comprising an adhesive gel.

16. A system comprising:

a first transmitter assembly comprising:

a transmitting coil configured to generate a first magnetic signal in response to receiving an electric current;

a first surface comprising a set of icons, an icon of the set being separated from another icon of the set by a known distance, the set of icons configured to identify a pose of the first transmitter assembly with respect to a camera device and distinguish the transmitter assembly from one or more other transmitter assembly; and a second surface comprising an adhesive layer configured to removably affix to another object; and a second transmitter assembly comprising:

a transmitting coil configured to generate a second magnetic signal in response to receiving an electric current;

a first surface comprising an icon of the set being separated from another icon of the set by a known distance, the set of icons configured to identify a pose of the second transmitter assembly with respect to a camera device and distinguish the transmitter assembly from the first transmitter assembly; and a second surface configured to removably affix to another object.

17. The system of claim 16, wherein the first transmitter assembly and the second transmitter assembly can be removed and rearranged with respect to one another in an environment.

18. The system of claim 16, further comprising a receiver configured to receive the first magnetic signal from the first transmitter assembly and the second magnetic signal from the second transmitter assembly, wherein a computing device in communication with the receiver is configured to determine a location of a tracked object based on the first magnetic signal, the second magnetic signal, the pose of the first transmitter assembly, and the pose of the second transmitter assembly.

19. The system of claim 16, further comprising a camera configured to detect the pose of the first transmitter assembly and the pose of the second transmitter assembly.

* * * * *